United States Patent
Li

(10) Patent No.: US 11,803,036 B2
(45) Date of Patent: Oct. 31, 2023

(54) CAMERA OPTICAL LENS

(71) Applicant: AAC Optics (Changzhou) Co., Ltd., Changzhou (CN)

(72) Inventor: Wanxia Li, Shenzhen (CN)

(73) Assignee: AAC Optics (Changzhou) Co., Ltd., Changzhou (CN)

(*) Notice: Subject to any disclaimer, the term of this patent is extended or adjusted under 35 U.S.C. 154(b) by 425 days.

(21) Appl. No.: 17/131,787

(22) Filed: Dec. 23, 2020

(65) Prior Publication Data

US 2022/0011548 A1  Jan. 13, 2022

(30) Foreign Application Priority Data

Jul. 13, 2020 (CN) .......................... 202010666138.0

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ........ G02B 13/0045; G02B 9/62; G02B 9/64; G02B 13/18
See application file for complete search history.

(56) References Cited

U.S. PATENT DOCUMENTS

| | | | |
|---|---|---|---|
| 2009/0225444 A1* | 9/2009 | Yamamoto | G02B 13/04 359/761 |
| 2015/0168692 A1* | 6/2015 | Kitahara | G02B 13/0045 359/752 |
| 2018/0299647 A1* | 10/2018 | Wu | G02B 13/0045 |
| 2019/0187413 A1* | 6/2019 | Oinuma | G02B 27/0025 |
| 2019/0204549 A1* | 7/2019 | Oinuma | G02B 1/041 |

* cited by examiner

*Primary Examiner* — George G. King
*Assistant Examiner* — Anna Elizabeth Smith
(74) *Attorney, Agent, or Firm* — W&G Law Group

(57) ABSTRACT

A camera optical lens includes first to sixth lenses from object side to image side, with first, third and sixth lenses having negative refractive power and second and fourth lenses having positive refractive power, and satisfies: $-3.00 \leq f1/f \leq -1.50$; $1.50 \leq d4/d6 \leq 4.00$; and $R7/R8 \leq -8.00$, where f and f1 denotes respectively focal lengths of the camera optical lens and the first lens, R7 denotes a curvature radius of an object side surface of the fourth lens, R8 denotes a curvature radius of an image side surface of the fourth lens, d4 denotes an on-axis distance from an image side surface of the second lens to an object side surface of the third lens, and d6 denotes an on-axis distance from an image side surface of the third lens to the object side surface of the fourth lens, thereby meeting requirements of a large aperture, a wide angle, and ultra-thinness while having good optical performance.

9 Claims, 9 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain a better imaging quality, the camera lens traditionally mounted onto a mobile phone camera mostly adopts a structure including three lenses or four lenses. However, with the development of technology and increased diversified requirements from the users, in the situation where a pixel area of a photosensitive device gradually decreases and the requirement in the imaging quality gradually increases, a camera lens having a five-lens, or six-lens, or seven-lens structure has gradually appeared in lens design. Although the conventional camera lens including six lenses already has good optical performance, there is still some irrationality in terms of refractive power, a distance between lenses and shapes of the respective lenses. As a result, the lens structure cannot meet the design requirements of a large aperture, a wide angle and ultra-thinness while having good optical performance.

SUMMARY

In view of the above-mentioned problems, a purpose of the present invention is to provide a camera optical lens, which not only has good optical performance, but also meets the design requirements of a large aperture, a wide angle and ultra-thinness.

In order to solve the above-mentioned technical problems, an embodiment of the present invention provides a camera optical lens, including, from an object side to an image side, a first lens having a negative refractive power, a second lens having a positive refractive power, a third lens having a negative refractive power, a fourth lens having a positive refractive power, a fifth lens, and a sixth lens having a negative refractive power. The camera optical lens satisfies following conditions: $-3.00 \leq f1/f \leq -1.50$; $1.50 \leq d4/d6 \leq 4.00$; and $R7/R8 \leq -8.00$, where f denotes a focal length of the camera optical lens, f1 denotes a focal length of the first lens, R7 denotes a curvature radius of an object side surface of the fourth lens, R8 denotes a curvature radius of an image side surface of the fourth lens, d4 denotes an on-axis distance from an image side surface of the second lens to an object side surface of the third lens, and d6 denotes an on-axis distance from an image side surface of the third lens to the object side surface of the fourth lens.

In an improved embodiment, the camera optical lens further satisfies a following condition: $3.00 \leq (R9+R10)/(R9-R10)$, where R9 denotes a curvature radius of an object side surface of the fifth lens, and R10 denotes a curvature radius of an image side surface of the fifth lens.

In an improved embodiment, the camera optical lens further satisfies a following condition: $-4.50 \leq f3/f \leq -2.50$, where f3 denotes a focal length of the third lens.

In an improved embodiment, the camera optical lens further satisfies following conditions: $0.71 \leq (R1+R2)/(R1-R2) \leq 4.48$; and $0.02 \leq d1/TTL \leq 0.08$, where R1 denotes a curvature radius of an object side surface of the first lens, R2 denotes a curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $0.47 \leq f2/f \leq 1.75$; $-0.43 \leq (R3+R4)/(R3-R4) \leq -0.05$; and $0.05 \leq d3/TTL \leq 0.23$, where f2 denotes a focal length of the second lens, R3 denotes a curvature radius of an object side surface of the second lens, R4 denotes a curvature radius of the image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $1.08 \leq (R5+R6)/(R5-R6) \leq 5.51$; and $0.02 \leq d5/TTL \leq 0.08$, where R5 denotes a curvature radius of the object side surface of the third lens, R6 denotes a curvature radius of the image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $0.40 \leq f4/f \leq 1.34$; $0.39 \leq (R7+R8)/(R7-R8) \leq 1.50$; and $0.09 \leq d7/TTL \leq 0.30$, where f4 denotes a focal length of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-6.51 \leq f5/f \leq 117.01$; and $0.02 \leq d9/TTL \leq 0.10$, where f5 denotes a focal length of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies following conditions: $-4.12 \leq f6/f \leq -0.89$; $1.84 \leq (R11+R12)/(R11-R12) \leq 6.86$; and $0.03 \leq d11/TTL \leq 0.11$, where f6 denotes a focal length of the sixth lens, R11 denotes a curvature radius of an object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

In an improved embodiment, the camera optical lens further satisfies a following condition: $TTL/IH \leq 1.65$, where IH denotes an image height of the camera optical lens, and TTL denotes a total optical length from an object side surface of the first lens to an image plane of the camera optical lens along an optic axis.

The present invention has at least the following beneficial effects. The camera optical lens according to the present invention has good optical performance and further has characteristics of a large aperture, a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
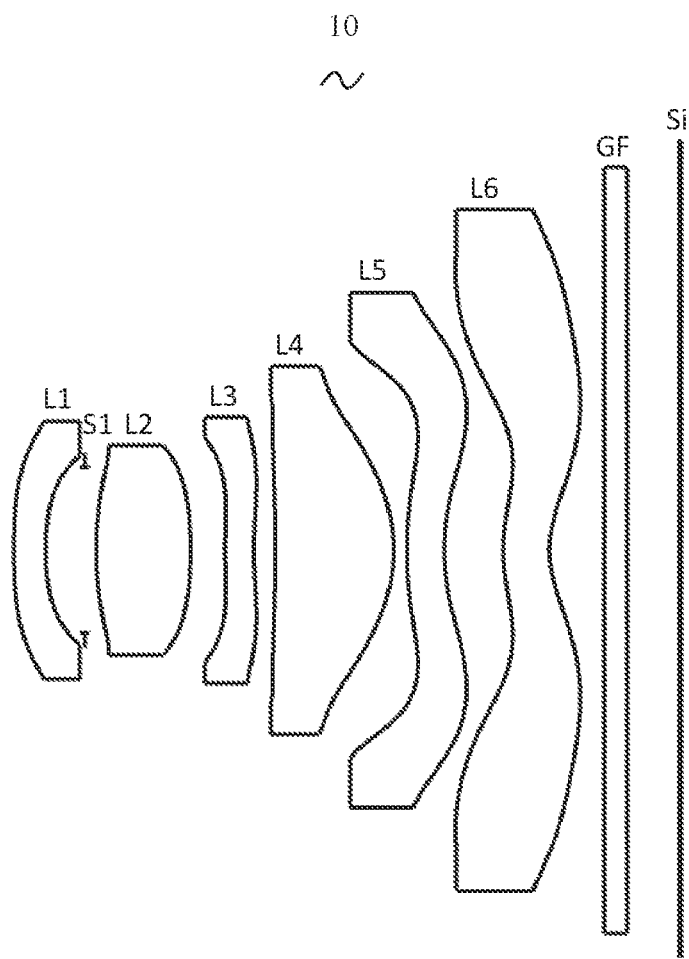
FIG. 1 is a schematic structural diagram of a camera optical lens according to a Embodiment 1.

With reference to the accompanying drawings, the present invention provides a camera optical lens 10. FIG. 1 shows a camera optical lens 10 according to Embodiment 1 of the present invention. The camera optical lens 10 includes six lenses. Specifically, the camera optical lens 10 includes, from an object side to an image side, a first lens L1, an aperture S1, a second lens L2, a third lens L3, a fourth lens L4, a fifth lens L5, and a sixth lens L6. Optical elements such as an optical filter GF may be provided between the sixth lens L6 and an image plane Si.

In this embodiment, the first lens L1 has a negative refractive power, the second lens L2 has a positive refractive power, the third lens L3 has a negative refractive power, the fourth lens L4 has a positive refractive power, the fifth lens L5 has a negative refractive power, and the sixth lens L6 has a negative refractive power.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In this embodiment, it is defined that a focal length of the camera optical lens 10 is denoted by f, a focal length of the first lens L1 is denoted by f1, and the camera optical lens satisfies the following condition: $-3.00 \le f1/f \le -1.50$, which specifies a ratio of the focal length of the first lens to the focal length of the camera optical lens and can effectively balance spherical aberration and field curvature of the system.

It is defined that an on-axis distance from an image side surface of the second lens L2 to an object side surface of the third lens L3 is denoted by d4, an on-axis distance from an image side surface of the third lens L3 to an object side surface of the fourth lens L4 is denoted by d6, and the camera optical lens further satisfies the following condition: $1.50 \le d4/d6 \le 4.00$, which specifies a ratio of the on-axis distance from the image side surface of the second lens to the object side surface of the third lens to the on-axis distance from the image side surface of the third lens to the object side surface of the fourth lens. Within a range defined by this condition, it is beneficial to reduce a total optical length and achieve ultra-thinness.

It is defined that a curvature radius of the object side surface of the fourth lens L4 is denoted by R7, a curvature radius of the image side surface of the fourth lens L4 is denoted by R8, and the camera optical lens further satisfies the following condition: $R7/R8 \le -8.00$, which specifies a shape of the fourth lens. Within a shape defined by this condition, it is beneficial to alleviate a degree of deflection of light passing through the lens and effectively reduce aberration.

It is defined that a curvature radius of an object side surface of the fifth lens L5 is denoted by R9, a curvature radius of an image side surface of the fifth lens L5 is denoted by R10, and the camera optical lens further satisfies the following condition: $3.00 \le (R9+R10)/(R9-R10)$, which specifies a shape of the fifth-lens. Within a range defined by this condition, with the development of ultra-thinness and wide-angle, it is beneficial to correct off-axis aberration.

It is defined that the focal length of the camera optical lens 10 is denoted by f, a focal length of the third lens L3 is denoted by f3, and the camera optical lens further satisfies the following condition: $-4.50 \le f3/f \le -2.50$, which specifies a ratio of the focal length of the third lens to the focal length of the camera optical lens. The reasonable allocation of refractive power enables the system to have better imaging quality and lower sensitivity.

In this embodiment, an object side surface of the first lens L1 is a convex surface at a paraxial position, and an image side surface of the first lens L1 is a concave surface at a paraxial position.

It is defined that a curvature radius of the object side surface of the first lens L1 is denoted by R1, a curvature radius of the image side surface of the first lens L1 is denoted by R2, and the camera optical lens further satisfies the following condition: $0.71 \leq (R1+R2)/(R1-R2) \leq 4.48$. By reasonably controlling a shape of the first lens L1, the first lens L1 can effectively correct spherical aberration of the system. As an example, the camera optical lens further satisfies the following condition: $1.13 \leq (R1+R2)/(R1-R2) \leq 3.58$.

An on-axis thickness of the first lens L1 is denoted by d1, a total optical length from the object side surface of the first lens to the image plane of the camera optical lens 10 along an optic axis is denoted by TTL, and the camera optical lens further satisfies the following condition: $0.02 \leq d1/TTL \leq 0.08$. Within a range defined by this condition, it is beneficial to achieve ultra-thinness. As an example, the camera optical lens further satisfies the following condition: $0.03 \leq d1/TTL \leq 0.06$.

In this embodiment, the object side surface of the second lens L2 is a convex surface at a paraxial position, and the image side surface of the second lens L2 is a convex surface at a paraxial position.

It is defined that the focal length of the camera optical lens 10 is denoted by f, a focal length of the second lens L2 is denoted by f2, and the camera optical lens further satisfies the following condition: $0.47 \leq f2/f \leq 1.75$. By controlling the positive refractive power of the second lens L2 within a reasonable range, it is beneficial to correct aberration of the optical system. As an example, the camera optical lens further satisfies the following condition: $0.76 \leq f2/f \leq 1.40$.

A curvature radius of the object side surface of the second lens L2 is denoted by R3, a curvature radius of the image side surface of the second lens L2 is denoted by R4, and the camera optical lens further satisfies the following condition: $-0.43 \leq (R3+R4)/(R3-R4) \leq -0.05$, which specifies a shape of the second lens L2. Within a range defined by this condition, with the development of ultra-thinness and wide angle of the camera optical lens, it is beneficial to correct longitudinal aberration. As an example, the camera optical lens further satisfies the following condition: $-0.27 \leq (R3+R4)/(R3-R4) \leq -0.06$.

An on-axis thickness of the second lens L2 is denoted by d3, the total optical length from the object side surface of the first lens to the image plane of the camera optical lens 10 along the optic axis is denoted by TTL, and the camera optical lens further satisfies the following condition: $0.05 \leq d3/TTL \leq 0.23$. Within a range defined by this condition, it is beneficial to achieve ultra-thinness. As an example, the camera optical lens further satisfies the following condition: $0.09 \leq d3/TTL \leq 0.18$.

In this embodiment, the object side surface of the third lens L3 is a convex surface at a paraxial position, and the image side surface of the third lens L3 is a concave surface at a paraxial position.

It is defined that a curvature radius of the object side surface of the third lens L3 is denoted by R5, a curvature radius of the image side surface of the third lens L3 is denoted by R6, and the camera optical lens further satisfies the following condition: $1.08 \leq (R5+R6)/(R5-R6) \leq 5.51$, which specifies a shape of the third lens. Within a range defined by this condition, it is beneficial to alleviate a degree of deflection of light passing through the lens and effectively reduce aberration. As an example, the camera optical lens further satisfies the following condition: $1.73 \leq (R5+R6)/(R5-R6) \leq 4.41$.

An on-axis thickness of the third lens L3 is denoted by d5, the total optical length from the object side surface of the first lens to the image plane of the camera optical lens 10 along the optic axis is denoted by TTL, and the camera optical lens further satisfies the following condition: $0.02 \leq d5/TTL \leq 0.08$. Within a range defined by this condition, it is beneficial to achieve ultra-thinness. As an example, the camera optical lens further satisfies the following condition: $0.03 \leq d5/TTL \leq 0.07$.

In this embodiment, the object side surface of the fourth lens L4 is a convex surface at a paraxial position, and the image side surface of the fourth lens is a convex surface at a paraxial position.

It is defined that the focal length of the camera optical lens 10 is denoted by f, a focal length of the fourth lens L4 is denoted by f4, and the camera optical lens further satisfies the following condition: $0.40 \leq f4/f \leq 1.34$, which specifies a ratio of the focal length of the fourth lens to the focal length of the camera optical lens. Within a range defined by this range, it is beneficial to improve the performance of the optical system. As an example, the camera optical lens further satisfies the following condition: $0.64 \leq f4/f \leq 1.07$.

A curvature radius of the object side surface of the fourth lens L4 is denoted by R7, a curvature radius of the image side surface of the fourth lens L4 is denoted by R8, and the camera optical lens further satisfies the following condition: $0.39 \leq (R7+R8)/(R7-R8) \leq 1.50$, which specifies a shape of the fourth lens L4. Within a range defined by this condition, with the development of ultra-thinness and wide angle, it is beneficial to correct off-axis aberration. As an example, the camera optical lens further satisfies the following condition: $0.62 \leq (R7+R8)/(R7-R8) \leq 1.20$.

An on-axis thickness of the fourth lens L4 is denoted by d7, the total optical length from the object side surface of the first lens to the image plane of the camera optical lens 10 along the optic axis is denoted by TTL, and the camera optical lens further satisfies the following condition: $0.09 \leq d7/TTL \leq 0.30$. Within a range defined by this condition, it is beneficial to achieve ultra-thinness. As an example, the camera optical lens further satisfies the following condition: $0.14 \leq d7/TTL \leq 0.24$.

In this embodiment, the object side surface of the fifth lens L5 is a convex surface at a paraxial position, and the image side surface of the fifth lens L5 is a concave surface at a paraxial position.

It is defined that the focal length of the camera optical lens 10 is denoted by f, a focal length of the fifth lens L5 is denoted by f5, and the camera optical lens further satisfies the following condition: $-6.51 \leq f5/f \leq 117.01$. The limitation on the fifth lens L5 can effectively smooth a light angle of the camera lens and reduce tolerance sensitivity. As an example, the camera optical lens further satisfies the following condition: $-4.07 \leq f5/f \leq 93.61$.

An on-axis thickness of the fifth lens L5 is denoted by d9, the total optical length from the object side surface of the first lens to the image plane of the camera optical lens 10 along the optic axis is denoted by TTL, and the camera optical lens further satisfies the following condition: $0.02 \leq d9/TTL \leq 0.10$. Within a range defined by this condition, it is beneficial to achieve ultra-thinness. As an example, the camera optical lens further satisfies the following condition: $0.03 \leq d9/TTL \leq 0.08$.

In this embodiment, the object side surface of the sixth lens L6 is a convex surface at a paraxial position, and the image side surface of the sixth lens L6 is a concave surface at a paraxial position.

It is defined that the focal length of the camera optical lens 10 is denoted by f, a focal length of the sixth lens L6 is denoted by f6, and the camera optical lens further satisfies the following condition: $-4.12 \leq f6/f \leq -0.89$. Reasonable distribution of refractive power enables the system to have better imaging quality and lower sensitivity. As an example, the camera optical lens further satisfies the following condition: $-2.58 \leq f6/f \leq -1.12$.

A curvature radius of the object side surface of the sixth lens L6 is denoted by R11, a curvature radius of the image side surface of the sixth lens L6 is denoted by R12, and the camera optical lens further satisfies the following condition: $1.84 \leq (R11+R12)/(R11-R12) \leq 6.86$, which specifies a shape of the sixth lens L6. Within a range defined by the condition, with the development of ultra-thinness and wide angle, it is beneficial to correct off-axis aberration. As an example, the camera optical lens further satisfies the following condition: $2.95 \leq (R11+R12)/(R11-R12) \leq 5.48$.

An on-axis thickness of the sixth lens L6 is denoted by d11, the total optical length from the object side surface of the first lens to the image plane of the camera optical lens 10 along the optic axis is denoted by TTL, and the camera optical lens further satisfies the following condition: $0.03 \leq d11/TTL \leq 0.11$. Within a range defined by this condition, it is beneficial to achieve ultra-thinness. As an example, the camera optical lens further satisfies the following condition: $0.04 \leq d11/TTL \leq 0.09$.

In this embodiment, the image height of the camera optical lens 10 is denoted by IH the total optical length from the object side surface of the first lens to the image plane of the camera optical lens 10 along the optic axis is denoted by TTL, and the camera optical lens further satisfies the following condition: $TTL/IH \leq 1.65$, which is beneficial to achieve ultra-thinness.

In this embodiment, a field of view (FOV) of the camera optical lens 10 is larger than or equal to 109°, so as to achieve a wide angle.

In this embodiment, an F number (FNO) of the camera optical lens 10 is smaller than or equal to 2.25, so as to achieve a large aperture and excellent imaging performance of the camera optical lens.

In this embodiment, the focal length of the camera optical lens 10 is denoted by f, a combined focal length of the first lens L1 and the second lens L2 is denoted by f12, and the camera optical lens further satisfies the following condition: $0.82 \leq f12/f \leq 2.85$. Within a range defined by this condition, aberration and distortion of the camera optical lens 10 can be eliminated, and a back focal length of the camera optical lens 10 can be reduced to maintain miniaturization of the camera optical lens system group. As an example, the camera optical lens further satisfies the following condition: $1.31 \leq f12/f \leq 2.28$.

When the above-mentioned conditions are satisfied, the camera optical lens 10 can meet the design requirements of a large aperture, a wide angle and ultra-thinness while having good optical performance. According to the characteristics of the camera optical lens 10, the camera optical lens 10 is especially suitable for the mobile phone camera lens assembly and the WEB camera lens composed of imaging elements such as CCD and CMOS for high pixels.

The following description will illustrate the camera optical lens 10 of the present invention with examples. The symbols described in each example are as follows. The focal length, the on-axis distance, the curvature radius, the on-axis thickness, the inflection point position, and stagnation point position are all expressed in unit of mm.

TTL: a total optical length (an on-axis distance from an object side surface of a first lens L1 to an image plane along an optic axis of the camera optical lens), in unit of mm.

FNO: an F number (a ratio of an effective focal length of the camera optical lens to an entrance pupil diameter).

As an example, the object side surface and/or the image side surface of the lenses may also be provided with an inflection point and/or stagnation point, so as to meet requirements of high imaging quality. For detailed implementation manners, please refer to the following description.

Table 1 and Table 2 show design data of the camera optical lens 10 according to Embodiment 1 of the present invention.

TABLE 1

|  | R |  | d | nd |  | vd |
| --- | --- | --- | --- | --- | --- | --- |
| S1 | ∞ | d0= | −0.646 |  |  |  |
| R1 | 8.165 | d1= | 0.290 | nd1 | 1.5346 | v1 | 55.69 |
| R2 | 2.622 | d2= | 0.460 |  |  |  |
| R3 | 3.255 | d3= | 0.860 | nd2 | 1.5444 | v2 | 55.82 |
| R4 | −3.801 | d4= | 0.315 |  |  |  |
| R5 | 5.705 | d5= | 0.262 | nd3 | 1.6700 | v3 | 19.39 |
| R6 | 3.114 | d6= | 0.196 |  |  |  |
| R7 | 177.161 | d7= | 1.080 | nd4 | 1.5444 | v4 | 55.82 |
| R8 | −1.446 | d8= | 0.119 |  |  |  |
| R9 | 3.672 | d9= | 0.340 | nd5 | 1.6700 | v5 | 19.39 |
| R10 | 2.031 | d10= | 0.539 |  |  |  |
| R11 | 1.539 | d11= | 0.420 | nd6 | 1.5444 | v6 | 55.82 |
| R12 | 0.921 | d12= | 0.500 |  |  |  |
| R13 | ∞ | d13= | 0.210 | ndg | 1.5168 | vg | 64.17 |
| R14 | ∞ | d14= | 0.487 |  |  |  |

The symbols in the above table are defined as follows.
S1: aperture;
R: curvature radius at a center of a lens
R1: curvature radius of an object side surface of a first lens L1;
R2: curvature radius of an image side surface of the first lens L1;
R3: curvature radius of an object side surface of a second lens L2;
R4: curvature radius of an image side surface of the second lens L2;
R5: curvature radius of an object side surface of a third lens L3;
R6: curvature radius of an image side surface of the third lens L3;
R7: curvature radius of an object side surface of a fourth lens L4;
R8: curvature radius of an image side surface of the fourth lens L4;
R9: curvature radius of an object side surface of a fifth lens L5;
R10: curvature radius of an image side surface of the fifth lens L5;
R11: curvature radius of an object side surface of a sixth lens L6;
R12: curvature radius of an image side surface of the sixth lens L6;
R13: curvature radius of an object side surface of an optical filter GF;
R14: curvature radius of an image side surface of the optical filter GF;
d: on-axis thickness of a lens, on-axis distance between adjacent lenses;

d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to an image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | −3.0679E+01 | 1.9228E−01 | −1.1912E−01 | −1.1322E−02 | 4.7745E−01 | −1.2314E+00 |
| R2 | 3.4842E+00 | 2.5792E−01 | 5.1219E−01 | −7.2201E+00 | 4.5366E+01 | −1.6264E+02 |
| R3 | 1.2885E+00 | 1.7309E−02 | −8.8716E−02 | 1.1579E+00 | −8.0730E+00 | 3.0433E+01 |
| R4 | 9.9942E+00 | −8.3633E−02 | −3.4914E−01 | 2.7085E+00 | −1.1565E+01 | 2.9413E+01 |
| R5 | −8.5334E+01 | −4.3967E−01 | 1.5139E+00 | −6.2625E+00 | 1.6569E+01 | −2.8921E+01 |
| R6 | −9.9124E+01 | −2.1878E−01 | 8.8396E−01 | −3.1977E+00 | 6.8844E+00 | −9.4182E+00 |
| R7 | 1.1289E+02 | −2.6874E−01 | 9.8509E−01 | −2.0271E+00 | 2.6134E+00 | −2.1719E+00 |
| R8 | −9.0813E−01 | −4.1695E−02 | 2.9233E−01 | −6.0902E−01 | 7.4883E−01 | −5.8633E−01 |
| R9 | 3.9991E−01 | 2.0760E−02 | −6.3737E−02 | −3.1258E−02 | 5.3016E−02 | −2.2349E−02 |
| R10 | −2.1687E+00 | 2.4303E−02 | −1.5348E−01 | 1.1886E−01 | −5.2790E−02 | 1.4809E−02 |
| R11 | −1.0597E+01 | −1.2963E−01 | −5.5949E−02 | 6.8249E−02 | −2.5000E−02 | 4.7991E−03 |
| R12 | −4.1672E+00 | −1.2500E−01 | 3.5754E−02 | −2.3591E−03 | −1.6564E−03 | 6.2914E−04 |

| | Cone coefficient | Aspherical coefficient | | | |
|---|---|---|---|---|---|
| | k | A14 | A16 | A18 | A20 |
| R1 | −3.0679E+01 | 1.6098E+00 | −1.1824E+00 | 4.6203E−01 | −7.4847E−02 |
| R2 | 3.4842E+00 | 3.5240E+02 | −4.5569E+02 | 3.2409E+02 | −9.7708E+01 |
| R3 | 1.2885E+00 | −6.8162E+01 | 9.0124E+01 | −6.5162E+01 | 1.9905E+01 |
| R4 | 9.9942E+00 | −4.6009E+01 | 4.3360E+01 | −2.2586E+01 | 4.9953E+00 |
| R5 | −8.5334E+01 | 3.3287E+01 | −2.4312E+01 | 1.0204E+01 | −1.8655E+00 |
| R6 | −9.9124E+01 | 8.3598E+00 | −4.6622E+00 | 1.4800E+00 | −2.0284E−01 |
| R7 | 1.1289E+02 | 1.1694E+00 | −3.9587E−01 | 7.6675E−02 | −6.5042E−03 |
| R8 | −9.0813E−01 | 2.9407E−01 | −8.9843E−02 | 1.5042E−02 | −1.0513E−03 |
| R9 | 3.9991E−01 | 9.1108E−04 | 1.7567E−03 | −4.4696E−04 | 3.3308E−05 |
| R10 | −2.1687E+00 | −2.6543E−03 | 2.9562E−04 | −1.8578E−05 | 4.9754E−07 |
| R11 | −1.0597E+01 | −5.1807E−04 | 2.9364E−05 | −6.2516E−07 | −4.5705E−09 |
| R12 | −4.1672E+00 | −1.0897E−04 | 1.0429E−05 | −5.2871E−07 | 1.1072E−08 |

Herein, k represents a cone coefficient, and A4, A6, A8, A10, A12, A14, A16, A18, and A20 represents aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the equation (1), x represents a vertical distance between a point on an aspherical curve and an optic axis, and y represents an aspherical depth (a vertical distance between a point on the aspherical surface that is distanced from the optic axis by R and a surface tangent to a vertex of the aspherical surface on the optic axis).

For convenience, the aspherical surface of each lens adopts the aspherical surface specified by the above-mentioned equation (1). However, the present invention is not limited to the aspherical polynomial form represented by the equation (1).

Table 3 and Table 4 show the design data of the inflection point and the stagnation point of each lens in the camera optical lens 10 according to Embodiment 1. Herein, P1R1, and P1R2 respectively represent the object side surface and the image side surface of the first lens L1; P2R1 and P2R2 respectively represent the object side surface and the image side surface of the second lens L2; P3R1 and P3R2 respectively represent the object side surface and the image side surface of the third lens L3; P4R1 and P4R2 respectively represent the object side surface and the image side surface of the fourth lens L4; P5R1 and P5R2 respectively represent the object side surface and the image side surface of the fifth lens L5; and P6R1 and P6R2 respectively represent the object side surface and the image side surface of the sixth lens L6. The corresponding data in the "inflection point position" column is a vertical distance from the inflection point set on a surface of each lens to the optic axis of the camera optical lens 10. The corresponding data in the "stagnation point position" column is a vertical distance from the stagnation point set on a surface of each lens to the optic axis of the camera optical lens 10.

TABLE 3

| | Number of inflection points | Inflection point position 1 | Inflection point position 2 | Inflection point position 3 |
|---|---|---|---|---|
| P1R1 | 1 | 1.145 | / | / |
| P1R2 | 1 | 0.855 | / | / |
| P2R1 | 2 | 0.735 | 0.855 | / |
| P2R2 | 0 | / | / | / |
| P3R1 | 2 | 0.205 | 1.005 | / |
| P3R2 | 2 | 0.305 | 1.075 | / |
| P4R1 | 3 | 0.045 | 0.685 | 1.155 |
| P4R2 | 3 | 1.155 | 1.545 | 1.645 |
| P5R1 | 2 | 0.675 | 1.705 | / |
| P5R2 | 3 | 0.705 | 2.045 | 2.365 |
| P6R1 | 3 | 0.415 | 1.465 | 2.735 |
| P6R2 | 1 | 0.545 | / | / |

TABLE 4

| | Number of stagnation points | Stagnation point position 1 | Stagnation point position 2 | Stagnation point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 1 | 0.365 | / | / |
| P3R2 | 2 | 0.605 | 1.215 | / |
| P4R1 | 3 | 0.075 | 1.095 | 1.205 |
| P4R2 | 0 | / | / | / |
| P5R1 | 1 | 1.035 | / | / |
| P5R2 | 1 | 1.255 | / | / |
| P6R1 | 3 | 0.785 | 2.545 | 2.815 |
| P6R2 | 1 | 1.345 | / | / |

Figure 2:
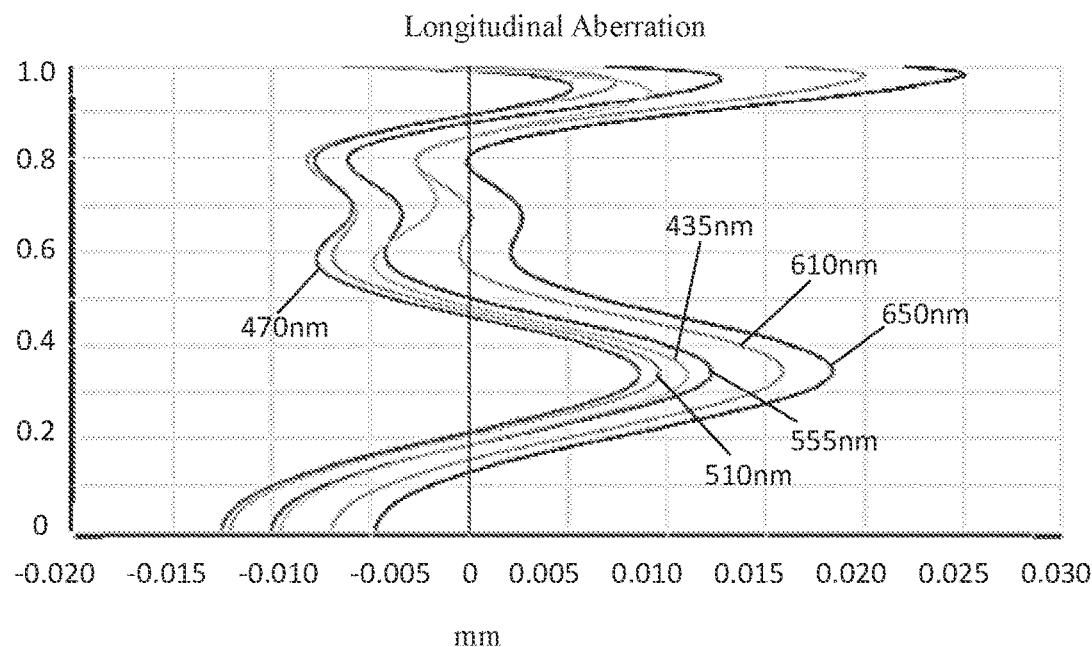
FIG. 2 is a schematic diagram of longitudinal aberration of the camera optical lens shown in FIG. 1.
Figure 3:
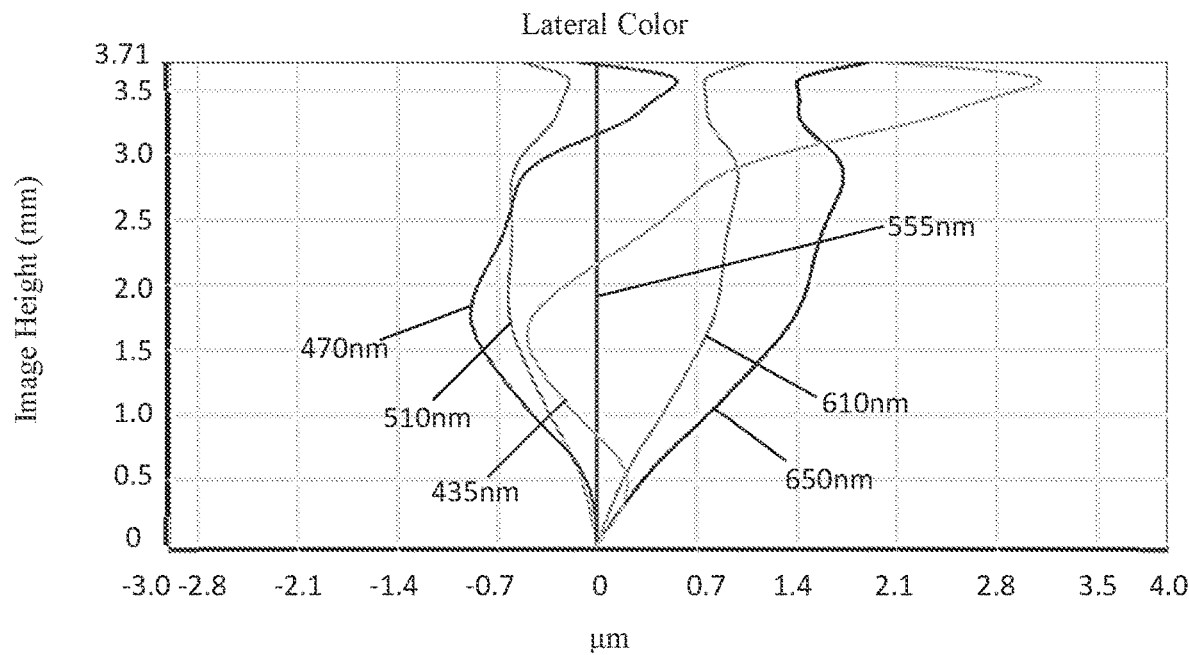
FIG. 3 is a schematic diagram of lateral color of the camera optical lens shown in FIG. 1.
Figure 4:
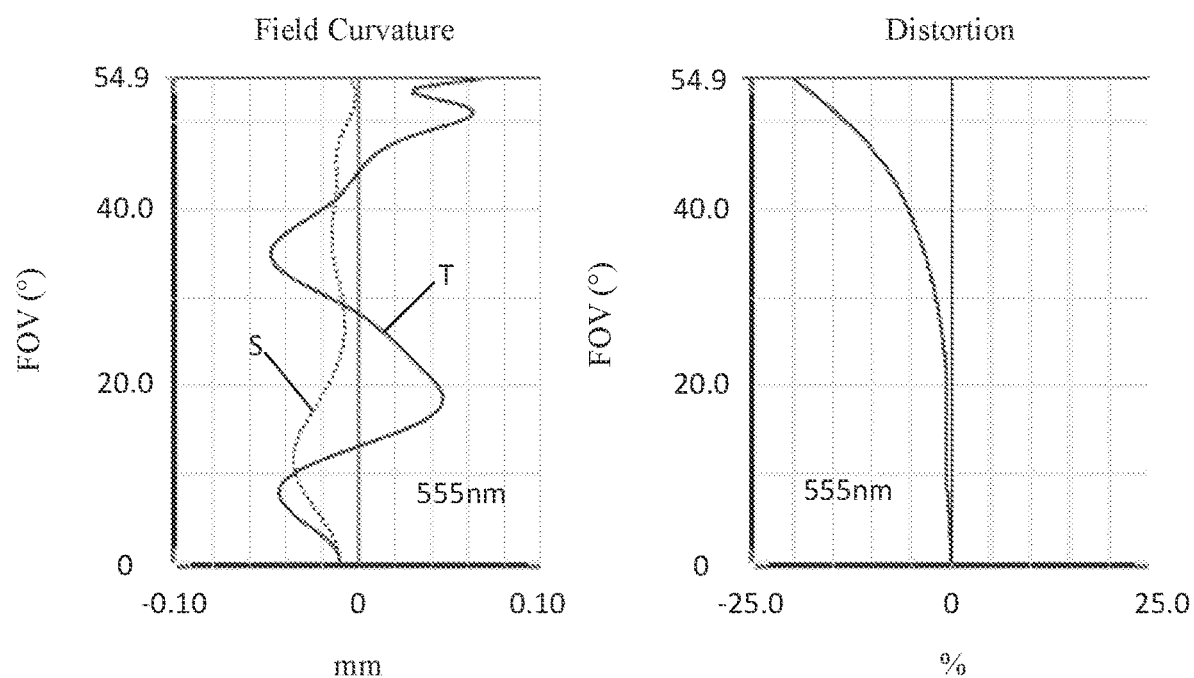
FIG. 4 is a schematic diagram of field curvature and distortion of the camera optical lens shown in FIG. 1.
Figure 5:
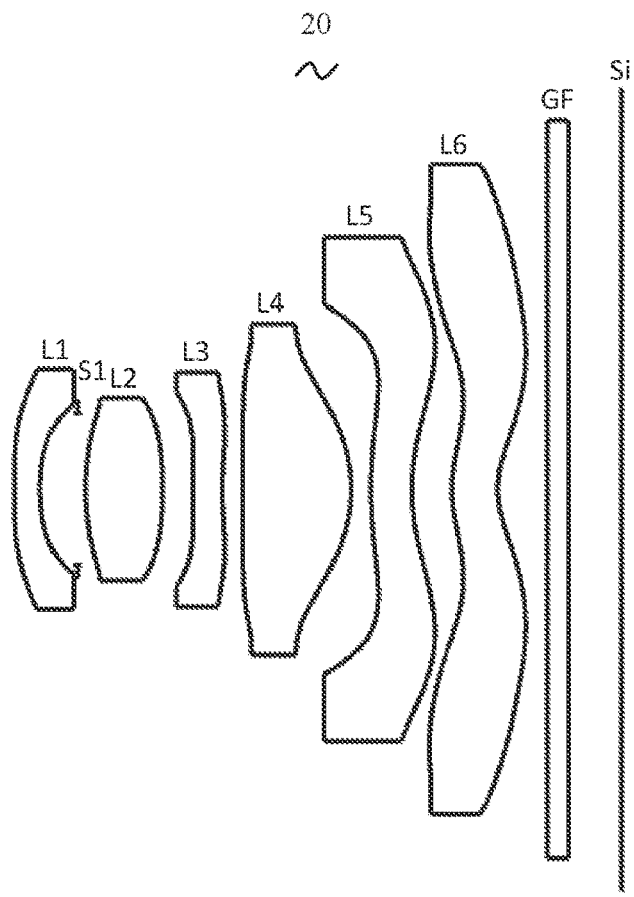
FIG. 5 is a schematic structural diagram of a camera optical lens according to Embodiment 2.

FIG. 2 and FIG. 3 respectively show schematic diagrams of longitudinal aberration and lateral color of light having wavelengths of 650 nm, 610 nm, 555 nm, 510 nm, 470 nm, and 435 mm after passing through the camera optical lens 10 according to Embodiment 1. FIG. 4 shows a schematic diagram of field curvature and distortion of light having a wavelength of 555 nm after passing through the camera optical lens 10 according to Embodiment 1. In FIG. 4, the field curvature S is the field curvature in a sagittal direction, and the field curvature T is the field curvature in a meridian direction.

In addition, the values corresponding to the various parameters and the parameters specified in the respective conditions in each of Embodiments 1, 2, 3 and 4 are listed in Table 17.

As shown in Table 17, Embodiment 1 satisfies the respective conditions.

In this embodiment, an entrance pupil diameter ENPD of the camera optical lens is 1.452 mm, the full field of view image height IH is 3.711 mm, and the FOV in a diagonal direction is 109.80°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Embodiment 2 is basically the same as Embodiment 1, the symbols have the same representation as Embodiment 1, and only the difference from Embodiment 1 will be described in the following.

Table 5 and Table 6 show the design data of the camera optical lens 20 according to Embodiment 2 of the present invention.

TABLE 5

| | R | d | | nd | | vd |
|---|---|---|---|---|---|---|
| S1 | ∞ | d0= | −0.628 | | | |
| R1 | 11.978 | d1= | 0.257 | nd1 | 1.5346 | v1 | 55.69 |
| R2 | 2.064 | d2= | 0.452 | | | |
| R3 | 2.533 | d3= | 0.771 | nd2 | 1.5444 | v2 | 55.82 |
| R4 | −3.940 | d4= | 0.302 | | | |
| R5 | 6.154 | d5= | 0.299 | nd3 | 1.6700 | v3 | 19.39 |
| R6 | 2.781 | d6= | 0.200 | | | |
| R7 | 11.931 | d7= | 1.084 | nd4 | 1.5444 | v4 | 55.82 |
| R8 | −1.477 | d8= | 0.197 | | | |
| R9 | 4.216 | d9= | 0.412 | nd5 | 1.6700 | v5 | 19.39 |
| R10 | 2.131 | d10= | 0.401 | | | |
| R11 | 1.259 | d11= | 0.456 | nd6 | 1.5444 | v6 | 55.82 |
| R12 | 0.807 | d12= | 0.500 | | | |
| R13 | ∞ | d13= | 0.210 | ndg | 1.5168 | vg | 64.17 |
| R14 | ∞ | d14= | 0.524 | | | |

Table 6 shows the aspherical surface data of the respective lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | −3.9645E+01 | 1.9272E−01 | −7.2851E−02 | −2.4866E−01 | 1.0074E+00 | −1.9602E+00 |
| R2 | 3.6649E+00 | 2.9248E−01 | −3.6795E−01 | 4.8768E−01 | 7.6716E+00 | −5.4308E+01 |
| R3 | 7.5602E−01 | −1.4232E−02 | 4.5810E−01 | −3.8374E+00 | 1.9253E+01 | −6.1751E+01 |
| R4 | 1.4554E+01 | −1.0945E−01 | 3.7176E−02 | −1.0541E−01 | 6.2480E−02 | 6.5755E−01 |
| R5 | −2.3425E+02 | −3.5434E−01 | 4.7164E−01 | −1.3713E+00 | 2.6346E+00 | −3.4733E+00 |
| R6 | −9.1891E+01 | −1.3736E−01 | 7.0333E−02 | −1.3448E−01 | 2.1273E−01 | −2.2042E−01 |
| R7 | 2.9561E+00 | −1.8591E−01 | 4.5614E−01 | −6.3647E−01 | 5.8253E−01 | −3.3691E−01 |
| R8 | −8.9891E−01 | −9.8277E−02 | 3.2401E−01 | −5.0961E−01 | 5.3795E−01 | −3.7121E−01 |

TABLE 6-continued

| | | | | | | |
|---|---|---|---|---|---|---|
| R9 | 1.4206E+00 | −2.6291E−02 | 2.7221E−03 | −6.4482E−02 | 6.2079E−02 | −2.5395E−02 |
| R10 | −2.8564E+00 | 3.0796E−02 | −1.3566E−01 | 1.0961E−01 | −5.0352E−02 | 1.3998E−02 |
| R11 | −7.3625E+00 | −2.0142E−01 | 8.2818E−02 | −2.8302E−02 | 1.1157E−02 | −3.3878E−03 |
| R12 | −4.1922E+00 | −1.7283E−01 | 1.0081E−01 | −4.4117E−02 | 1.3521E−02 | −2.7213E−03 |

| | Cone coefficient | Aspherical coefficient | | | |
|---|---|---|---|---|---|
| | k | A14 | A16 | A18 | A20 |
| R1 | −3.9645E+01 | 2.2525E+00 | −1.5559E+00 | 5.9791E−01 | −9.8177E−02 |
| R2 | 3.6649E+00 | 1.6753E+02 | −2.7551E+02 | 2.3439E+02 | −8.1281E+01 |
| R3 | 7.5602E−01 | 1.2428E+02 | −1.5187E+02 | 1.0280E+02 | −2.9509E+01 |
| R4 | 1.4554E+01 | −1.9388E+00 | 2.2972E+00 | −1.4083E+00 | 4.5510E−01 |
| R5 | −2.3425E+02 | 3.3257E+00 | −2.2062E+00 | 8.3314E−01 | −9.3239E−02 |
| R6 | −9.1891E+01 | 1.9907E−01 | −1.3187E−01 | 4.8900E−02 | −6.2666E−03 |
| R7 | 2.9561E+00 | 1.1383E−01 | −1.7561E−02 | −4.3877E−04 | 3.4034E−04 |
| R8 | −8.9891E−01 | 1.6767E−01 | −4.7254E−02 | 7.4332E−03 | −4.9403E−04 |
| R9 | 1.4206E+00 | 2.9091E−03 | 9.2296E−04 | −2.8467E−04 | 2.1126E−05 |
| R10 | −2.8564E+00 | −2.3085E−03 | 2.0783E−04 | −7.9050E−06 | 5.4273E−09 |
| R11 | −7.3625E+00 | 6.3824E−04 | −7.0487E−05 | 4.2090E−06 | −1.0532E−07 |
| R12 | −4.1922E+00 | 3.4965E−04 | −2.7635E−05 | 1.2271E−06 | −2.3492E−08 |

Table 7 and Table 8 show the design data of the inflection point and stagnation point of each lens in the camera optical lens 20 according to Embodiment 2 of the present invention.

TABLE 7

| | Number of inflection points | Inflection point position 1 | Inflection point position 2 | Inflection point position 3 |
|---|---|---|---|---|
| P1R1 | 1 | 1.105 | / | / |
| P1R2 | 0 | / | / | / |
| P2R1 | 1 | 0.795 | / | / |
| P2R2 | 0 | / | / | / |
| P3R1 | 2 | 0.185 | 0.935 | / |
| P3R2 | 2 | 0.295 | 0.985 | / |
| P4R1 | 3 | 0.235 | 0.525 | 1.355 |
| P4R2 | 2 | 1.025 | 1.575 | / |
| P5R1 | 1 | 0.655 | / | / |
| P5R2 | 3 | 0.755 | 2.175 | 2.375 |
| P6R1 | 3 | 0.425 | 1.515 | 2.745 |
| P6R2 | 1 | 0.505 | / | / |

TABLE 8

| | Number of stagnation points | Stagnation point position 1 | Stagnation point position 2 | Stagnation point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 1 | 0.325 | / | / |
| P3R2 | 2 | 0.585 | 1.125 | / |
| P4R1 | 0 | / | / | / |
| P4R2 | 0 | / | / | / |
| P5R1 | 1 | 1.025 | / | / |
| P5R2 | 1 | 1.405 | / | / |
| P6R1 | 3 | 0.865 | 2.515 | 2.835 |
| P6R2 | 1 | 1.335 | / | / |

Figure 6:
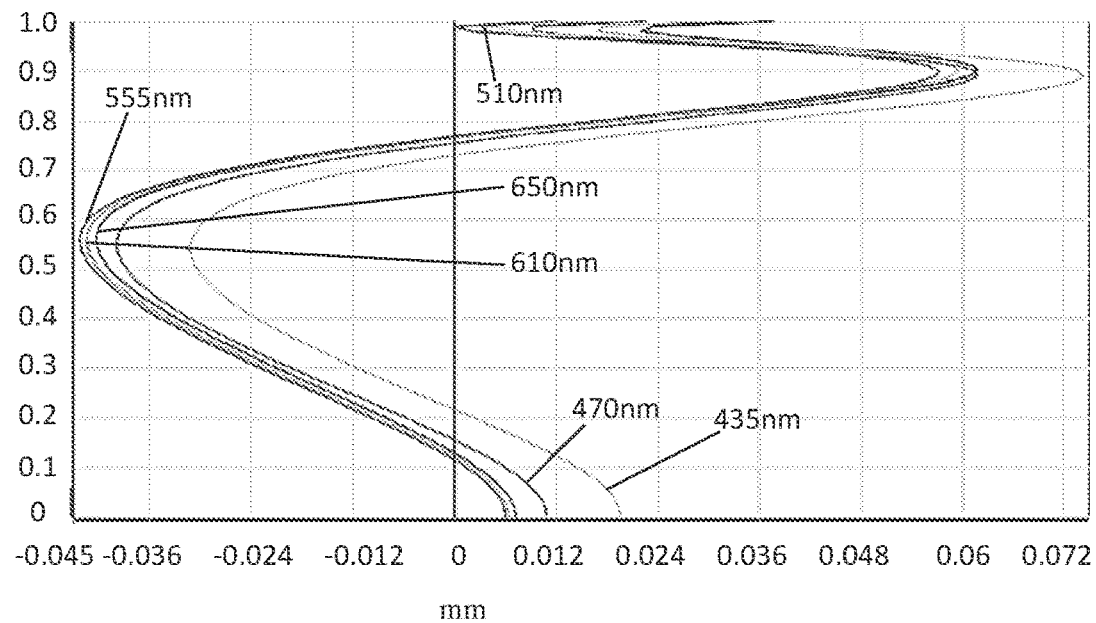
FIG. 6 is a schematic diagram of longitudinal aberration of the camera optical lens shown in FIG. 5.
Figure 7:
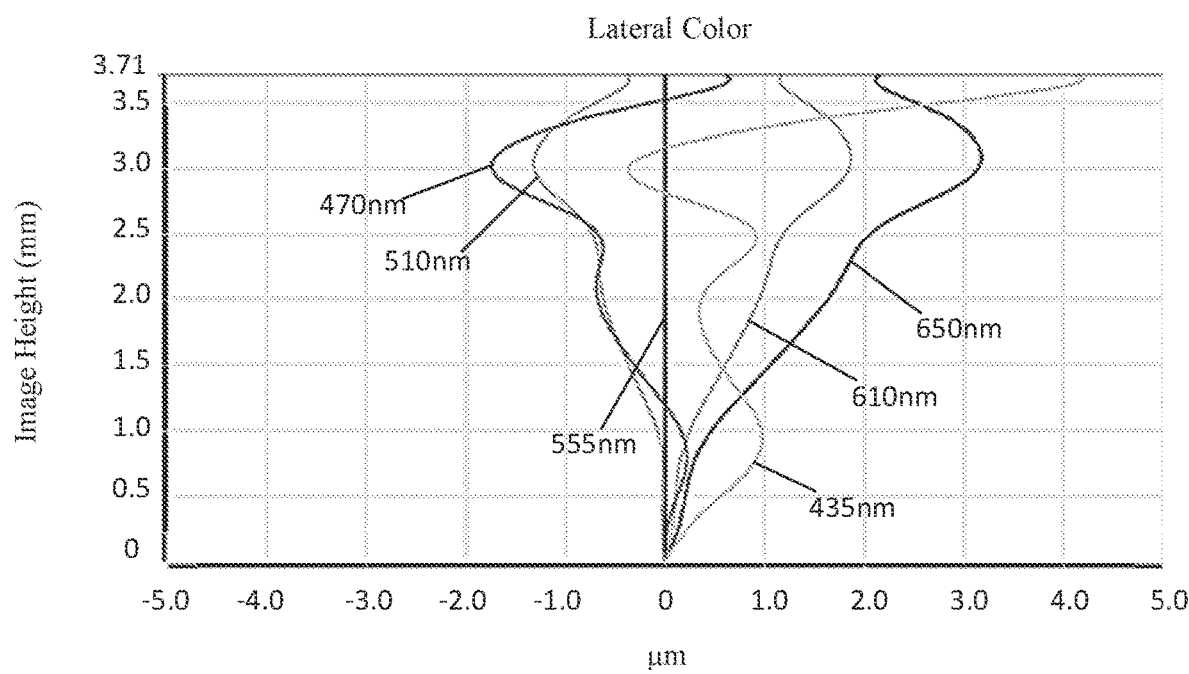
FIG. 7 is a schematic diagram of lateral color of the camera optical lens shown in FIG. 5.
Figure 8:
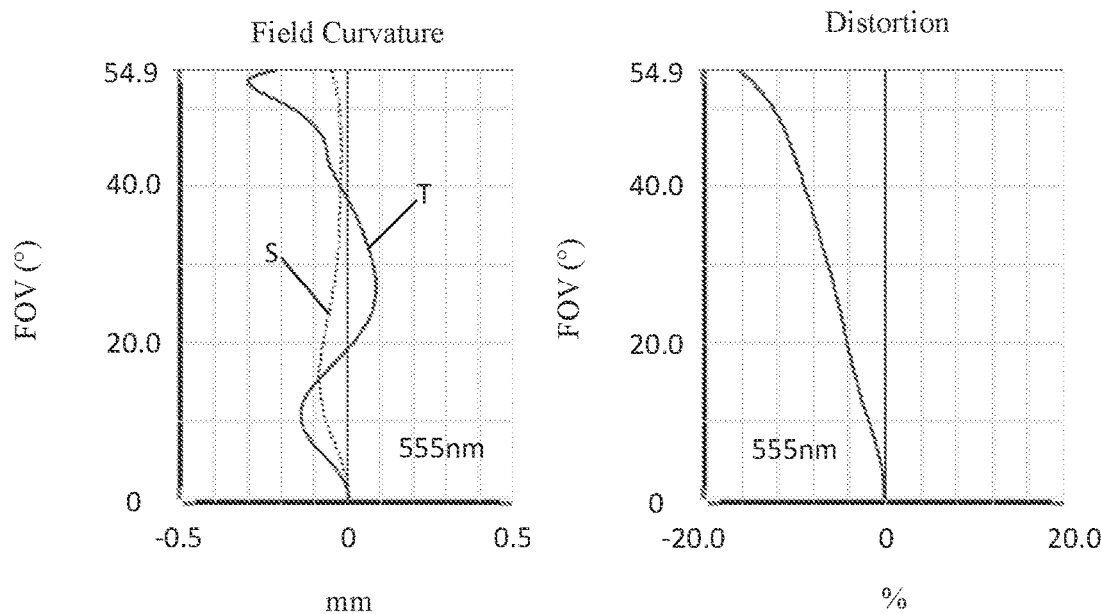
FIG. 8 is a schematic diagram of field curvature and distortion of the camera optical lens shown in FIG. 5.
Figure 9:
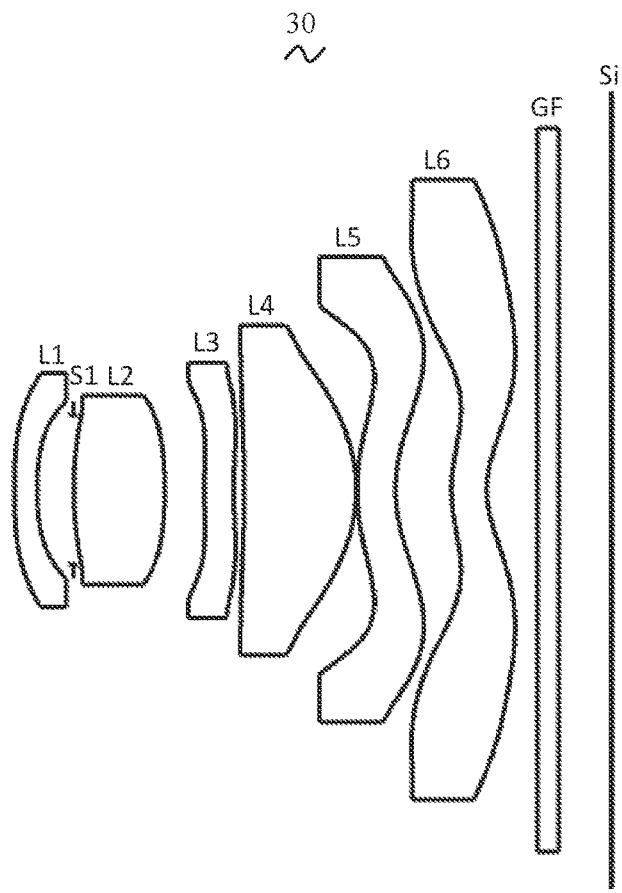
FIG. 9 is a schematic structural diagram of a camera optical lens according to Embodiment 3.

FIG. 6 and FIG. 7 respectively show schematic diagrams of longitudinal aberration and lateral color of light having wavelengths of 650 nm, 610 nm, 555 nm, 510 nm, 470 nm, and 435 mm after passing through the camera optical lens 20 according to Embodiment 2. FIG. 8 shows a schematic diagram of field curvature and distortion of light having a wavelength of 555 nm after passing through the camera optical lens 20 according to Embodiment 2.

As shown in Table 17, Embodiment 2 satisfies the respective conditions.

In this embodiment, an entrance pupil diameter ENPD of the camera optical lens is 1.387 mm, the full field of view image height IH is 3.711 mm, and the FOV in a diagonal direction is 109.80°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Embodiment 3 is basically the same as Embodiment 1, the symbols have the same representation as Embodiment 1, and only the difference from Embodiment 1 will be described in the following.

Table 9 and Table 10 shows the design data of the camera optical lens 30 according to Embodiment 3 of the present invention.

TABLE 9

| | R | d | | nd | | vd |
|---|---|---|---|---|---|---|
| S1 | ∞ | d0= | −0.581 | | | |
| R1 | 8.652 | d1= | 0.224 | nd1 | 1.5346 | v1 | 55.69 |
| R2 | 2.818 | d2= | 0.362 | | | |
| R3 | 3.473 | d3= | 0.891 | nd2 | 1.5444 | v2 | 55.82 |
| R4 | −4.302 | d4= | 0.393 | | | |
| R5 | 6.810 | d5= | 0.290 | nd3 | 1.6700 | v3 | 19.39 |
| R6 | 3.895 | d6= | 0.100 | | | |
| R7 | 16884255.888 | d7= | 1.110 | nd4 | 1.5444 | v4 | 55.82 |
| R8 | −1.541 | d8= | 0.009 | | | |
| R9 | 2.256 | d9= | 0.372 | nd5 | 1.6700 | v5 | 19.39 |
| R10 | 1.593 | d10= | 0.552 | | | |
| R11 | 1.485 | d11= | 0.346 | nd6 | 1.5444 | v6 | 55.82 |
| R12 | 0.921 | d12= | 0.500 | | | |
| R13 | ∞ | d13= | 0.210 | ndg | 1.5168 | vg | 64.17 |
| R14 | ∞ | d14= | 0.530 | | | |

Table 10 shows the aspherical surface data of the lenses in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | −3.1557E+01 | 1.9228E−01 | −1.1912E−01 | −1.1322E−02 | 4.7745E−01 | −1.2314E+00 |
| R2 | −2.0589E+00 | 2.5792E−01 | 5.1219E−01 | −7.2201E+00 | 4.5366E+01 | −1.6264E+02 |
| R3 | −5.0571E+00 | 1.7309E−02 | −8.8716E−02 | 1.1579E+00 | −8.0730E+00 | 3.0433E+01 |
| R4 | 1.1688E+01 | −8.3633E−02 | −3.4914E−01 | 2.7085E+00 | −1.1565E+01 | 2.9413E+01 |
| R5 | 3.3763E+01 | −4.3967E−01 | 1.5139E+00 | −6.2625E+00 | 1.6569E+01 | −2.8921E+01 |
| R6 | −1.1958E+02 | −2.1878E−01 | 8.8396E−01 | −3.1977E+00 | 6.8844E+00 | −9.4182E+00 |
| R7 | −1.6886E+02 | −2.6874E−01 | 9.8509E−01 | −2.0271E+00 | 2.6134E+00 | −2.1719E+00 |
| R8 | −6.1527E−01 | −4.1695E−02 | 2.9233E−01 | −6.0902E−01 | 7.4883E−01 | −5.8633E−01 |
| R9 | −3.3567E+00 | 2.0760E−02 | −6.3737E−02 | −3.1258E−02 | 5.3016E−02 | −2.2349E−02 |
| R10 | −2.2843E+00 | 2.4303E−02 | −1.5348E−01 | 1.1886E−01 | −5.2790E−02 | 1.4809E−02 |
| R11 | −9.5084E+00 | −1.2963E−01 | −5.5949E−02 | 6.8249E−02 | −2.5000E−02 | 4.7991E−03 |
| R12 | −4.1672E+00 | −1.2500E−01 | 3.5754E−02 | −2.3591E−03 | −1.6564E−03 | 6.2914E−04 |

| | Cone coefficient | Aspherical coefficient | | | |
|---|---|---|---|---|---|
| | k | A14 | A16 | A18 | A20 |
| R1 | −3.1557E+01 | 1.6098E+00 | −1.1824E+00 | 4.6203E−01 | −7.4847E−02 |
| R2 | −2.0589E+00 | 3.5240E+02 | −4.5569E+02 | 3.2409E+02 | −9.7708E+01 |
| R3 | −5.0571E+00 | −6.8162E+01 | 9.0124E+01 | −6.5162E+01 | 1.9905E+01 |
| R4 | 1.1688E+01 | −4.6009E+01 | 4.3360E+01 | −2.2586E+01 | 4.9953E+00 |
| R5 | 3.3763E+01 | 3.3287E+01 | −2.4312E+01 | 1.0204E+01 | −1.8655E+00 |
| R6 | −1.1958E+02 | 8.3598E+00 | −4.6622E+00 | 1.4800E+00 | −2.0284E−01 |
| R7 | −1.6886E+02 | 1.1694E+00 | −3.9587E−01 | 7.6675E−02 | −6.5042E−03 |
| R8 | −6.1527E−01 | 2.9407E−01 | −8.9843E−02 | 1.5042E−02 | −1.0513E−03 |
| R9 | −3.3567E+00 | 9.1108E−04 | 1.7567E−03 | −4.4696E−04 | 3.3308E−05 |
| R10 | −2.2843E+00 | −2.6543E−03 | 2.9562E−04 | −1.8578E−05 | 4.9754E−07 |
| R11 | −9.5084E+00 | −5.1807E−04 | 2.9364E−05 | −6.2516E−07 | −4.5705E−09 |
| R12 | −4.1672E+00 | −1.0897E−04 | 1.0429E−05 | −5.2871E−07 | 1.1072E−08 |

Table 11 and Table 12 show the design data of the inflection point and the stagnation point of each lens in the camera optical lens 30 according to Embodiment 3 of the present invention.

TABLE 11

| | Number of inflection points | Inflection point position 1 | Inflection point position 2 |
|---|---|---|---|
| P1R1 | 0 | / | / |
| P1R2 | 1 | 0.855 | / |
| P2R1 | 1 | 0.685 | / |
| P2R2 | 0 | / | / |
| P3R1 | 2 | 0.205 | 0.975 |
| P3R2 | 2 | 0.305 | 1.075 |
| P4R1 | 2 | 0.725 | 1.155 |
| P4R2 | 2 | 1.195 | 1.515 |
| P5R1 | 2 | 0.695 | 1.715 |
| P5R2 | 2 | 0.725 | 2.055 |
| P6R1 | 2 | 0.425 | 1.465 |
| P6R2 | 1 | 0.545 | / |

TABLE 12

| | Number of stagnation points | Stagnation point position 1 | Stagnation point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.375 | / |
| P3R2 | 2 | 0.575 | 1.215 |
| P4R1 | 0 | / | / |
| P4R2 | 0 | / | / |
| P5R1 | 1 | 1.105 | / |
| P5R2 | 1 | 1.335 | / |
| P6R1 | 2 | 0.795 | 2.505 |
| P6R2 | 1 | 1.345 | / |

Figure 10:
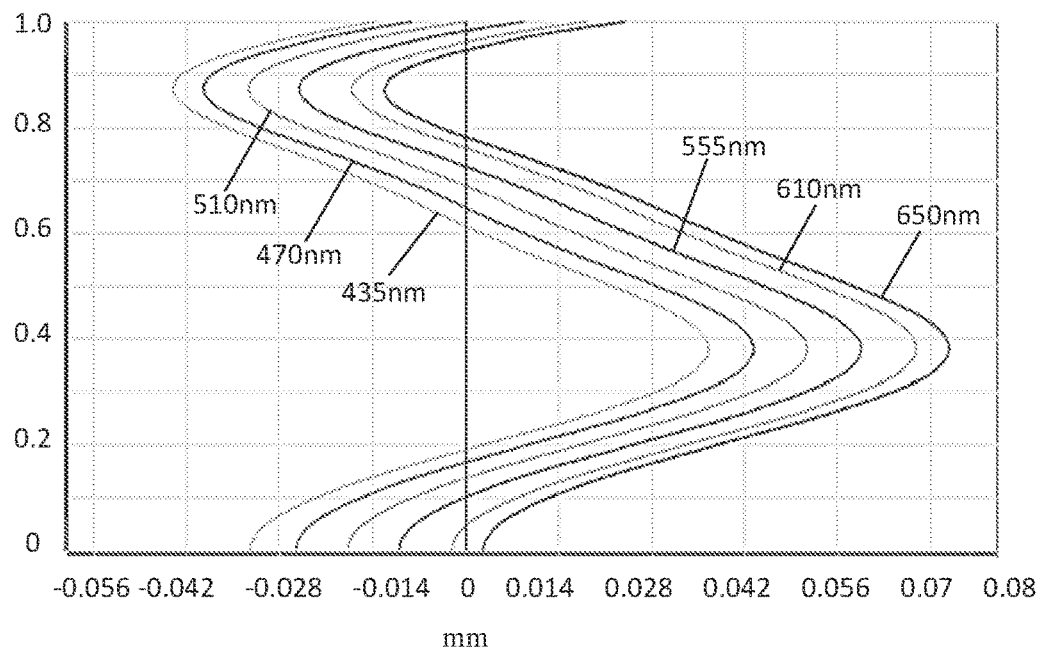
FIG. 10 is a schematic diagram of longitudinal aberration of the camera optical lens shown in FIG. 9.
Figure 11:
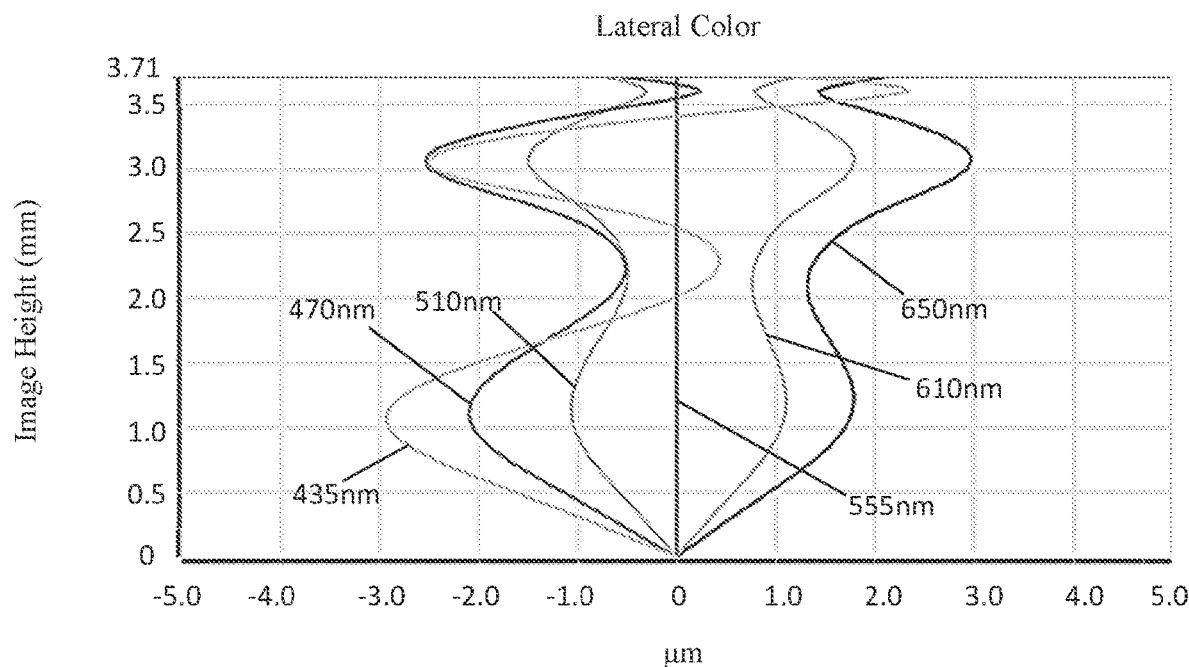
FIG. 11 is a schematic diagram of lateral color of the camera optical lens shown in FIG. 9.
Figure 12:
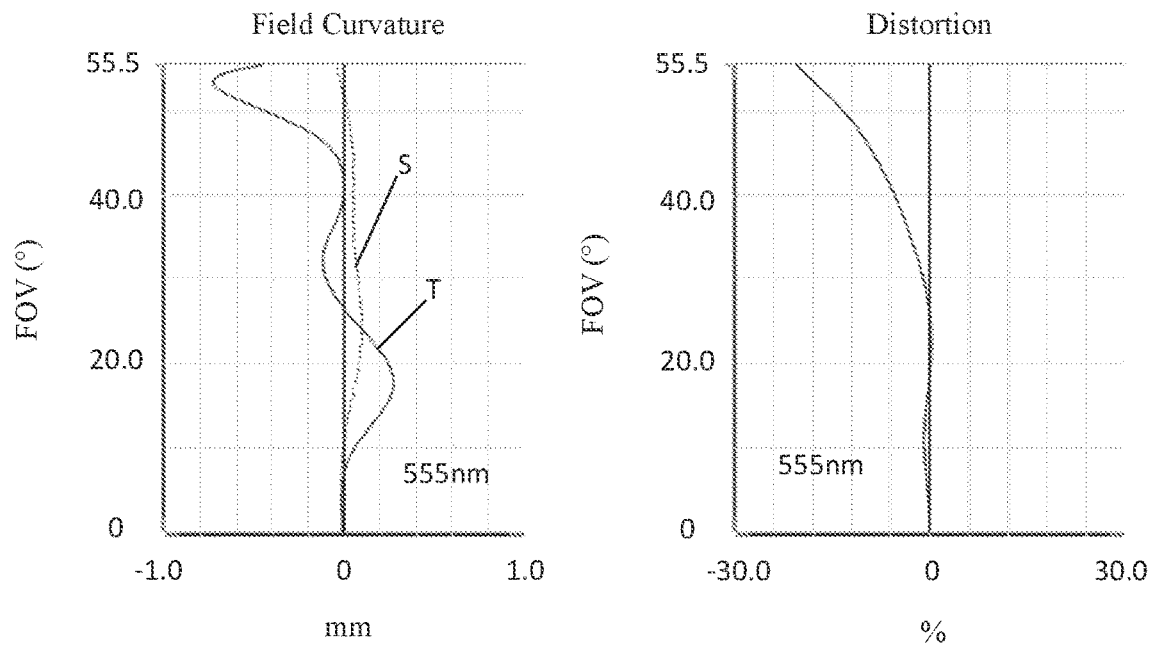
FIG. 12 is a schematic diagram of field curvature and distortion of the camera optical lens shown in FIG. 9.
Figure 13:
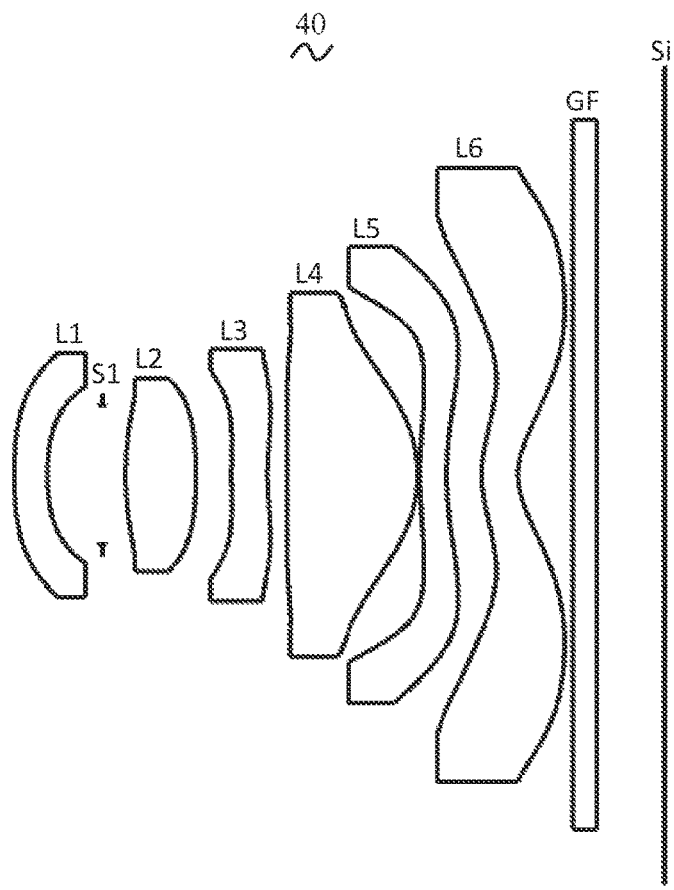
FIG. 13 is a schematic structural diagram of a camera optical lens according to Embodiment 4.

FIG. 10 and FIG. 11 respectively show schematic diagrams of longitudinal aberration and lateral color of light having wavelengths of 650 nm, 610 nm, 555 nm, 510 nm, 470 nm, and 435 mm after passing through the camera optical lens 30 according to Embodiment 3. FIG. 12 shows a schematic diagram of field curvature and distortion of light having a wavelength of 555 nm after passing through the camera optical lens 30 according to Embodiment 3.

The values corresponding to the various parameters and the parameters specified in the conditions in Embodiment 3 are listed in Table 17. It can be seen that the imaging optical system according to this embodiment satisfies the above-mentioned conditions.

In this embodiment, an entrance pupil diameter ENPD of the camera optical lens is 1.423 mm, the full field of view image height IH is 3.711 mm, and the FOV in a diagonal direction is 111.00°, so that the camera optical lens 30 can meet the design requirements of a large aperture, a wide angle and ultra-thinness. The on-axis and off-axis color aberrations are fully corrected, and the camera optical lens 30 has excellent optical performance.

Embodiment 4

Embodiment 4 is basically the same as Embodiment 1, the symbols have the same representation as Embodiment 1, and only the difference from Embodiment 1 will be described in the following.

In this embodiment, the fifth lens L5 has a positive refractive power.

Table 13 and Table 14 show the design data of the camera optical lens 40 of Embodiment 4 of the present invention.

TABLE 13

|  | R | d | nd |  | vd |
|---|---|---|---|---|---|
| S1 | ∞ | d0= −0.791 | | | |
| R1 | 4.387 | d1= 0.299 | nd1 | 1.5346 | v1 55.69 |
| R2 | 2.186 | d2= 0.703 | | | |
| R3 | 3.216 | d3= 0.638 | nd2 | 1.5444 | v2 55.82 |
| R4 | −3.877 | d4= 0.320 | | | |
| R5 | 8.768 | d5= 0.326 | nd3 | 1.6700 | v3 19.39 |
| R6 | 3.225 | d6= 0.176 | | | |
| R7 | 23.13 | d7= 1.173 | nd4 | 1.5444 | v4 55.82 |
| R8 | −1.454 | d8= 0.021 | | | |
| R9 | 3.836 | d9= 0.244 | nd5 | 1.6700 | v5 19.39 |
| R10 | 3.836 | d10= 0.315 | | | |
| R11 | 1.202 | d11= 0.329 | nd6 | 1.5444 | v6 55.82 |
| R12 | 0.689 | d12= 0.500 | | | |
| R13 | ∞ | d13= 0.210 | ndg | 1.5168 | vg 64.17 |
| R14 | ∞ | d14= 0.613 | | | |

Table 14 shows the aspherical surface data of the lenses in the camera optical lens 40 according to Embodiment 4 of the present invention

TABLE 14

| | Cone coefficient | Aspherical coefficient | | | | |
|---|---|---|---|---|---|---|
| | k | A4 | A6 | A8 | A10 | A12 |
| R1 | 3.2568E+00 | 1.3961E−01 | 1.8129E−01 | −1.1675E+00 | 3.4496E+00 | −6.0152E+00 |
| R2 | 3.8484E+00 | 3.7473E−01 | −1.7630E+00 | 1.0947E+01 | −3.9036E+01 | 8.0196E+01 |
| R3 | −1.0247E+00 | 6.6883E−02 | −9.2806E−01 | 7.8557E+00 | −4.2395E+01 | 1.4333E+02 |
| R4 | 1.2206E+01 | −1.4939E−01 | 8.1105E−02 | 6.8696E−01 | −6.6253E+00 | 2.4169E+01 |
| R5 | −9.2870E+01 | −3.1935E−01 | −2.2803E−01 | 2.6667E+00 | −1.0810E+01 | 2.5153E+01 |
| R6 | −9.6246E+01 | 1.9893E−02 | −1.0015E+00 | 3.5279E+00 | −7.0918E+00 | 8.9636E+00 |
| R7 | 2.4280E+02 | −1.8993E−02 | −3.6623E−01 | 1.3880E+00 | −2.3235E+00 | 2.2588E+00 |
| R8 | −8.0749E−01 | −2.7112E−01 | 7.1454E−01 | −1.0699E+00 | 1.1240E+00 | −7.8354E−01 |
| R9 | −2.8239E−01 | −1.7454E−01 | 1.3069E−01 | −8.2990E−02 | 4.5584E−02 | −2.1622E−02 |
| R10 | −1.5526E+00 | 9.5081E−02 | −3.6285E−01 | 4.4384E−01 | −3.1200E−01 | 1.3337E−01 |
| R11 | −6.5117E+00 | −1.5585E−01 | 2.4354E−02 | −8.5803E−03 | 1.6136E−02 | −9.1373E−03 |
| R12 | −2.8944E+00 | −1.9227E−01 | 1.2182E−01 | −5.8472E−02 | 1.9885E−02 | −4.5287E−03 |

| | Cone coefficient | Aspherical coefficient | | | |
|---|---|---|---|---|---|
| | k | A14 | A16 | A18 | A20 |
| R1 | 3.2568E+00 | 6.4641E+00 | −4.1902E+00 | 1.4997E+00 | −2.2772E−01 |
| R2 | 3.8484E+00 | −8.4643E+01 | 2.3671E+01 | 3.0870E+01 | −2.0868E+01 |
| R3 | −1.0247E+00 | −3.0648E+02 | 4.0125E+02 | −2.9350E+02 | 9.1600E+01 |
| R4 | 1.2206E+01 | −4.8668E+01 | 5.6495E+01 | −3.5469E+01 | 9.3000E+00 |
| R5 | −9.2870E+01 | −3.6498E+01 | 3.2742E+01 | −1.6518E+01 | 3.5713E+00 |
| R6 | −9.6246E+01 | −7.2644E+00 | 3.6933E+00 | −1.0764E+00 | 1.3771E−01 |
| R7 | 2.4280E+02 | −1.3618E+00 | 5.0386E−01 | −1.0509E−01 | 9.4560E−03 |
| R8 | −8.0749E−01 | 3.4956E−01 | −9.5086E−02 | 1.4283E−02 | −9.0607E−04 |
| R9 | −2.8239E−01 | 2.3322E−03 | 1.8776E−03 | −6.1445E−04 | 5.3160E−05 |
| R10 | −1.5526E+00 | −3.5405E−02 | 5.7199E−03 | −5.1579E−04 | 1.9921E−05 |
| R11 | −6.5117E+00 | 2.4663E−03 | −3.5906E−04 | 2.7389E−05 | −8.6470E−07 |
| R12 | −2.8944E+00 | 6.6758E−04 | −6.1068E−05 | 3.1543E−06 | −7.0340E−08 |

Table 15 and Table 16 show the design data of the inflection point and the stagnation point of each lens in the camera optical lens 40 according to Embodiment 4 of the present invention.

TABLE 15

| | Number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 1 | 0.625 | / | / |
| P2R2 | 0 | / | / | / |
| P3R1 | 2 | 0.175 | 0.945 | / |
| P3R2 | 2 | 0.315 | 1.015 | / |
| P4R1 | 3 | 0.265 | 0.585 | 1.215 |
| P4R2 | 2 | 0.995 | 1.555 | / |
| P5R1 | 2 | 0.415 | 1.675 | / |
| P5R2 | 1 | 0.635 | / | / |
| P6R1 | 3 | 0.455 | 2.015 | 2.415 |
| P6R2 | 2 | 0.555 | 2.685 | / |

TABLE 16

| | Number of stagnation points | stagnation point position 1 | stagnation point position 2 | stagnation point position 3 |
|---|---|---|---|---|
| P1R1 | 0 | / | / | / |
| P1R2 | 0 | / | / | / |
| P2R1 | 1 | 0.805 | / | / |
| P2R2 | 0 | / | / | / |
| P3R1 | 1 | 0.285 | / | / |
| P3R2 | 2 | 0.595 | 1.175 | / |
| P4R1 | 3 | 0.455 | 0.685 | 1.365 |
| P4R2 | 0 | / | / | / |
| P5R1 | 1 | 0.855 | / | / |
| P5R2 | 1 | 1.165 | / | / |

TABLE 16-continued

|  | Number of stagnation points | stagnation point position 1 | stagnation point position 2 | stagnation point position 3 |
|---|---|---|---|---|
| P6R1 | 1 | 0.905 | / | / |
| P6R2 | 1 | 1.585 | / | / |

Figure 14:
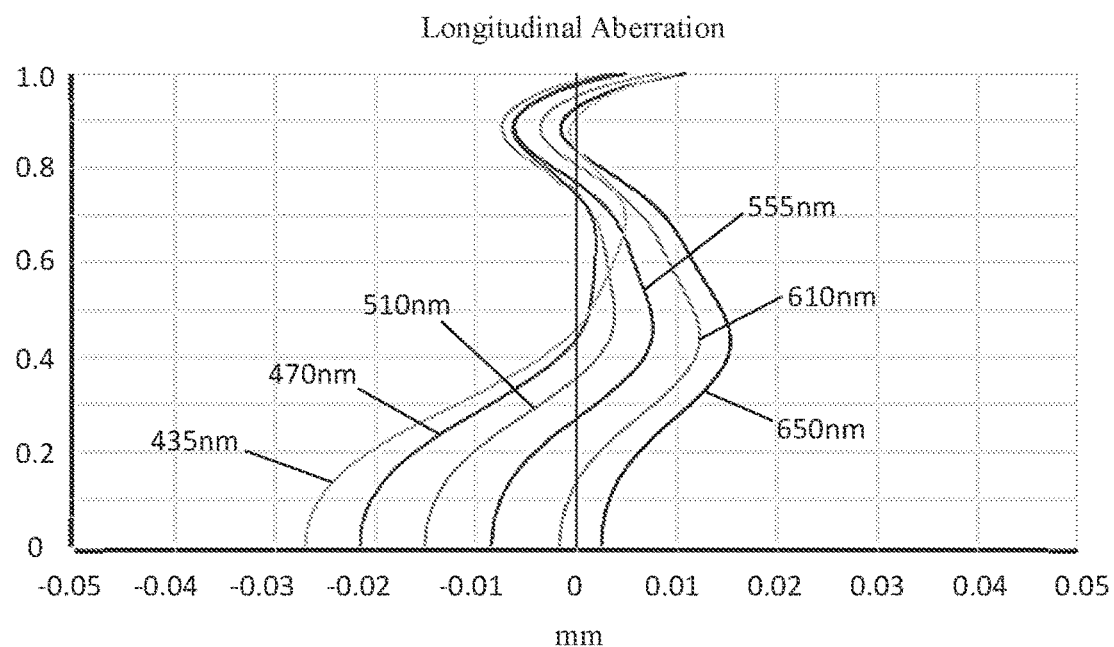
FIG. 14 is a schematic diagram of longitudinal aberration of the camera optical lens shown in FIG. 13.
Figure 15:
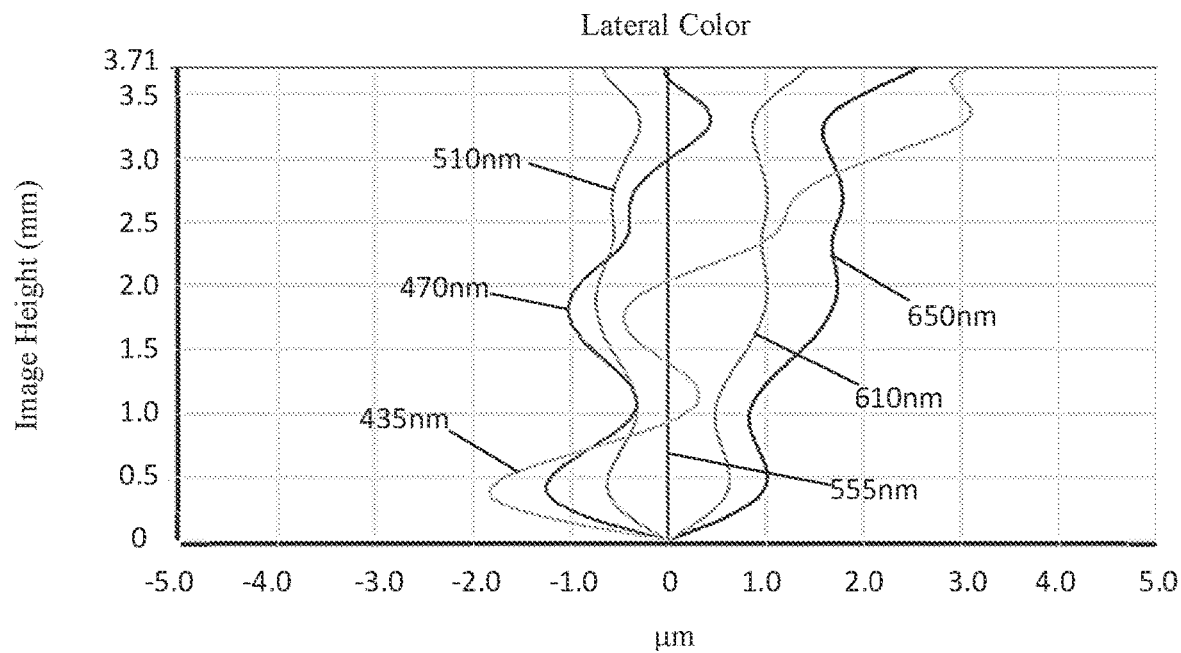
FIG. 15 is a schematic diagram of lateral color of the camera optical lens shown in FIG. 13.
Figure 16:
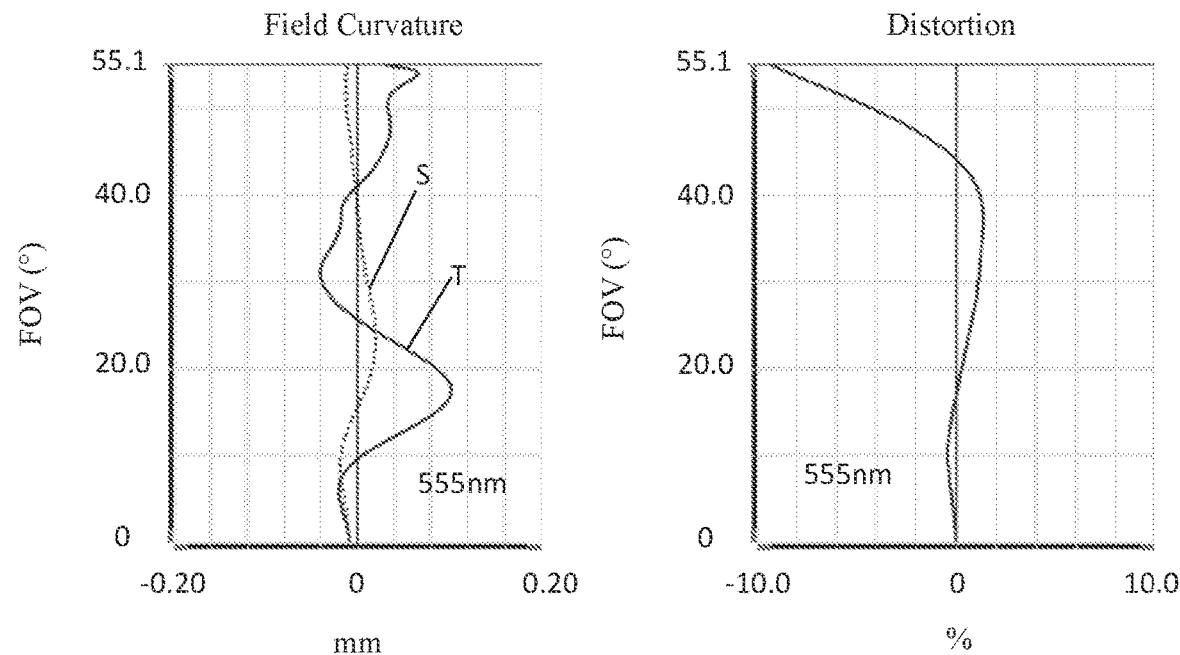
FIG. 16 is a schematic diagram of field curvature and distortion of the camera optical lens shown in FIG. 13.

FIG. 14 and FIG. 15 respectively show schematic diagrams of longitudinal aberration and lateral color of light having wavelengths of 650 nm, 610 nm, 555 nm, 510 nm, 470 nm, and 435 mm after passing through the camera optical lens 40 according to Embodiment 4. FIG. 16 shows a schematic diagram of field curvature and distortion of light having a wavelength of 555 nm after passing through the camera optical lens 40 according to Embodiment 4.

The values corresponding to the various parameters and the parameters specified in the conditions in Embodiment 4 are listed in Table 17. It can be seen that the imaging optical system according to this embodiment satisfies the above-mentioned conditions.

In this embodiment, an entrance pupil diameter ENPD of the camera optical lens is 1.273 mm, the full field of view image height IH is 3.711 mm, and the FOV in a diagonal direction is 110.20°, so that the camera optical lens 40 can meet the design requirements of a large aperture, a wide angle and ultra-thinness. The on-axis and off-axis color aberrations are fully corrected, and the camera optical lens 20 has excellent optical performance.

TABLE 17

| Parameters and conditions | Embodiment 1 | Embodiment 2 | Embodiment 3 | Embodiment 4 |
|---|---|---|---|---|
| f1/f | −2.26 | −1.51 | −2.48 | −2.99 |
| d4/d6 | 1.61 | 1.51 | 3.93 | 1.82 |
| R7/R8 | −122.52 | −8.08 | −10000000.00 | −15.90 |
| f | 3.252 | 3.107 | 3.186 | 2.851 |
| f1 | −7.334 | −4.692 | −7.899 | −8.525 |
| f2 | 3.355 | 2.947 | 3.667 | 3.324 |
| f3 | −10.568 | −7.780 | −14.020 | −7.726 |
| f4 | 2.632 | 2.477 | 2.822 | 2.548 |
| f5 | −7.331 | −6.920 | −10.367 | 222.399 |
| f6 | −5.529 | −6.401 | −5.678 | −3.817 |
| f12 | 5.330 | 5.844 | 6.045 | 4.807 |
| FNO | 2.24 | 2.24 | 2.24 | 2.24 |
| TTL | 6.078 | 6.065 | 5.889 | 5.867 |
| IH | 3.711 | 3.711 | 3.711 | 3.711 |
| FOV | 109.80 | 109.80 | 111.00 | 110.20 |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
   a first lens having a negative refractive power;
   a second lens having a positive refractive power;
   a third lens having a negative refractive power;
   a fourth lens having a positive refractive power;
   a fifth lens; and
   a sixth lens having a negative refractive power,
   wherein the camera optical lens satisfies following conditions:

$-3.00 \leq f1/f \leq -1.50$;

$1.50 \leq d4/d6 \leq 4.00$;

$R7/R8 \leq -8.00$; and $3.00 \leq (R9+R10)/(R9-R10)$, where f denotes a focal length of the camera optical lens, f1 denotes a focal length of the first lens, R7 denotes a curvature radius of an object side surface of the fourth lens, R8 denotes a curvature radius of an image side surface of the fourth lens, R9 denotes a curvature radius of an object side surface of the fifth lens, R10 denotes a curvature radius of an image side surface of the fifth lens, d4 denotes an on-axis distance from an image side surface of the second lens to an object side surface of the third lens, and d6 denotes an on-axis distance from an image side surface of the third lens to the object side surface of the fourth lens.

2. The camera optical lens as described in claim 1, further satisfying a following condition:

$-4.50 \leq f3/f \leq -2.50$, where f3 denotes a focal length of the third lens.

3. The camera optical lens as described in claim 1, further satisfying following conditions:

$0.71 \leq (R1+R2)/(R1-R2) \leq 4.48$; and $0.02 \leq d1/TTL \leq 0.08$, where R1 denotes a curvature radius of an object side surface of the first lens, R2 denotes a curvature radius of an image side surface of the first lens, d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$0.47 \leq f2/f \leq 1.75$;

$-0.43 \leq (R3+R4)/(R3-R4) \leq 0.05$; and $0.05 \leq d3/TTL \leq 0.23$, where f2 denotes a focal length of the second lens, R3 denotes a curvature radius of an object side surface of the second lens, R4 denotes a curvature radius of the image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying following conditions:

$1.08 \leq (R5+R6)/(R5-R6) \leq 5.51$; and $0.02 \leq d5/TTL \leq 0.08$, where R5 denotes a curvature radius of the object side surface of the third lens, R6 denotes a curvature radius of the image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$$0.40 \leq f4/f \leq 1.34;$$

$$0.39 \leq (R7+R8)/(R7-R8) \leq 1.50; \text{ and}$$

$$0.09 \leq d7/TTL \leq 0.30,$$

where f4 denotes a focal length of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$$-6.51 \leq f5/f \leq 117.01; \text{ and}$$

$$0.02 \leq d9/TTL \leq 0.10,$$

where f5 denotes a focal length of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying following conditions:

$$-4.12 \leq f6/f \leq -0.89;$$

$$1.84 \leq (R11+R12)/(R11-R12) \leq 6.86; \text{ and}$$

$$0.03 \leq d11/TTL \leq 0.11,$$

where f6 denotes a focal length of the sixth lens, R11 denotes a curvature radius of an object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

9. The camera optical lens as described in claim 1, further satisfying a following condition:

$$TTL/IH \leq 1.65,$$

where IH denotes an image height of the camera optical lens, and TTL denotes a total optical length from an object side surface of the first lens to an image plane of the camera optical lens along an optic axis.

* * * * *